Nov. 8, 1927.
G. V. HEIDT
1,648,228
LUBRICATING GREASE CUP
Filed March 3, 1922
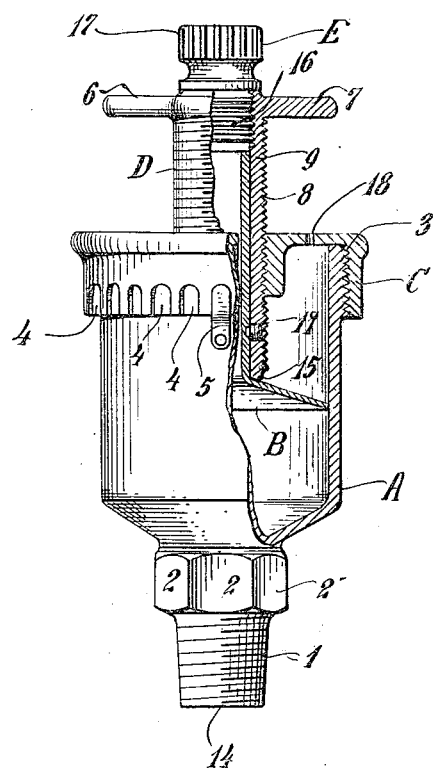
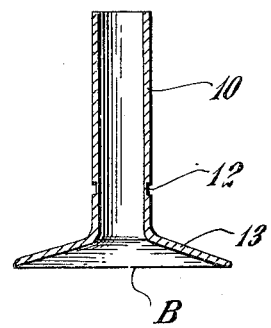
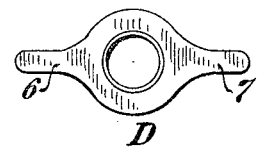
Inventor
Gulielmus V. Heidt
By his Attorney
Joseph Francis McMaier Patented Nov. 8, 1927.

1,648,228

UNITED STATES PATENT OFFICE.

GULIELMUS V. HEIDT, OF ATLANTA, GEORGIA.

LUBRICATING GREASE CUP.

Application filed March 3, 1922. Serial No. 540,875.

This invention relates to lubricating grease cups, and more particularly to that type of grease cup having means for forcing the contents thereof into the bearing, journal, or other location which it is desired to lubricate.

One object of the invention is to provide a lubricating grease cup having an air vent in its cover and so arranged as to exclude dust and other foreign substances.

A further feature is in the provision of a grease cup having means for discharging its contents upon the application of manual force.

Another purpose is to produce a grease cup that may be readily refilled without waste of material.

This invention consists in certain principles of construction and arrangement of elements, the preferred embodiment of which is shown in the accompanying drawings and will be hereinafter fully exemplified while the scope of the invention will be defined in the appended claims.

In the accompanying drawings:

Figure 1 is a combined elevation and vertical section of my lubricating grease cup and shows the construction of the interior thereof, with the automatic-locking pressure-cover wholly screwed down and locked in that position.

Figure 2 is a vertical sectional view of the combined thimble and diaphragm.

Figure 3 is a top plan view of the auxiliary pressure stem shown in Figure 1.

The preferred embodiment of this invention as shown in the drawings consists of the cup A, the combined thimble and diaphragm B, the automatic locking variable pressure cover C, the auxiliary variable pressure stem D, and the threaded plug E.

The cup A is preferably cylindrical in shape except at the bottom, which may be in truncated cone shape terminating in screw threads 1 provided for securely attaching the cup directly to the location to be lubricated or for attaching the said cup to piping, tubing or the like communicating with said location.

Faces 2 may also be provided as shown in Figure 1 to furnish a convenient purchase for a wrench or other suitable device employed to attach or remove the grease cup A.

The exterior of the upper end of the cup A has screw threads 3, interfitting with similar screw threads on the interior of the cover C, and which are provided as a means for removably attaching the cover C to said cup A, and also for applying variable pressure to the contents thereof.

The outer and lower edge of the cover C is provided with recesses 4 into which the spring catch 5 automatically seats to prevent exterior forces such as vibration and the like from rotating the cover C in a direction which if continued would cause said cover C to become partially or wholly unscrewed and to become detached from the cup A. Said recesses may be omitted and projections be substituted therefor without departing from the intent of this invention.

It will be noted that any rotation of the cover C will cause a vertical movement of said cover, and when said vertical movement is downwards in the direction of the orifice at the bottom of said cup A, that the lubricating material contained within said cup will be forcefully discharged through said orifice, and that the pressure exerted upon said material by said vertical movement of said cover will be variable and proportional to said vertical movement of said cover.

In the center of said cover C is provided the auxiliary variable pressure element D, which is adapted to be rotated by the thumb pieces 6 and 7 integral therewith. When thus rotated the pressure element D is adapted to be screwed up or down by means of the interfitting screw threads 8 on the exterior of the stem 9 of said pressure element D and in the center of the cover C, as shown in Figure 1.

If it should be deemed to be advantageous under certain conditions, a lock nut, as generally known and employed, may be added to the exterior of the stem 9 and adapted to contact with the top surface of the cover C. This lock nut, however, has not been shown on the drawings as it is believed in manufacturing my lubricating grease that the interfitting screw-threads 8 may be so made as to interfit with sufficient tightness to, under normal conditions, obviate the necessity for the addition of a lock nut.

A portion of the interior surface of the stem 9 may be machined to easily slip over and fit around the exterior surface of the thimble 10 of the combined thimble and diaphragm B shown in Figure 1.

At any suitable location in the wall of the stem 9 the threaded set screw 11 is provided, and upon the outer surface of the thimble 10 a cooperating annular recess 12 is cut at a location corresponding to the location of said set screw 11 when said thimble is inserted to its full length within the stem 9.

Said set screw 11 is adapted to project partly within said recess 12 sufficient to loosely suspend the thimble 10, and the truncated cone shaped diaphragm integral therewith, within the stem 9, so as to at all times permit independent rotation of the stem 9 and thimble 10, but to prevent all vertical movement of the stem 9 and the thimble 10 in relation to each other. The set screw 11 is recessed in the wall of the stem 9 so as to cause no interference with the screw threads 8 on the exterior surface of the stem 9, as shown in Figure 1.

It should be noted that the set screw 11 and the annular recess 12 are particularly provided and adapted for the purpose of simultaneously raising the thimble 10 and the truncated cone shaped diaphragm 13 integral therewith, when the auxiliary variable pressure element D is rotated so as to impart an upward vertical movement to the stem 9 thereof, after substantially all of the contents of the cup A have been discharged through the orifice 14.

This upward vertical movement of the element B will result in creating a reversed pressure or suction in the cup beneath said element and within the thimble 10. Said suction can be employed to withdraw lubricant material from a container having an opening adapted to be attached to the screw threads 16 of said element D.

When, however, the auxiliary variable pressure element D is rotated so as to impart a downward vertical movement to the stem 9 thereof, said downward vertical movement and the resulting pressure created is directly and correspondingly transmitted by the lower edge 15 of said stem 9 forming contact with that portion of the upper surface of said diaphragm 13 that is directly beneath said lower edge 15, with the result that said diaphragm will be forced downwards and all lubricating grease or the like beneath said diaphragm will, in part, be forced upwardly within the thimble 10 as far as the plug E, and the balance of the said grease will be gradually forced out of said cup A and be discharged through the orifice 14 in communication with the one or more locations requiring lubrication.

Although the plug E is adapted to close the top of the stem 9 of the auxiliary pressure element D, the opening which it serves to close is particularly adapted and useful as providing an auxiliary means for filling or replenishing the cup A with lubricating grease or the like.

Said plug E is removably attached to the stem 9 by interfitting screw threads 16 and may be readily unscrewed and altogether detached from said stem 9 by means of the knurled knob 17 at the top of said plug E and integral therewith. When said plug is thus removed, thereby creating an opening in said stem 9, direct communication is had through the interior of the thimble 10 with that portion of the interior of the cup A lying beneath the lower surface of the diaphragm 13, and said interior may be filled or replenished with lubricating grease or the like through said opening and thimble, as shown in Figure 1.

It should be noted that said opening at the top of the stem 9 of the variable pressure element D is furthermore particularly adapted to furnish a screw-threaded connection for readily and securely attaching the discharge orifice of containers of lubricating grease or the like, such as the well known form of collapsible tube, or the well known grease gun, or any other form of container having corresponding interfitting screwthreads, and which may, therefore, be adapted and employed to fill, or replenish, said portion of the cup A, from which grease, or the like, has been forcefully discharged by the diaphragm 13 through the orifice 14.

The air vent 18 in the top of the cover C has been provided to facilitate the upward and downward vertical movement of the variable pressure cover C, or the variable pressure element D operating the diaphragm 13, and it should be noted that said vent need not be of any greater diameter than that of the common pin in general use, and that it may, in some instances, be entirely eliminated, depending upon conditions and circumstances governing the particular locations to be lubricated, the location of the discharged orifice 14, the quality and quantity of lubricating material employed, and varying trade requirements generally.

In the preferred embodiment of my invention I have shown and described a truncated cone-shaped diaphragm, because I believe that this particular shape and form of diaphragm if manufactured of suitable material will under certain conditions of operation have a tendency to flatten and thereby increase slightly in diameter so as at all times to provide a tight contact between the edges of the diaphragm and the interior wall of the cup A and because of this action give results superior to other shaped diaphragms of various geometric shapes such as hemi-spherical, or flat, or S-shaped although these and other shaped diaphragms may after due trial and strict examination be found useful and be employed where conditions demand it wthout departing the spirit and intent of my invention.

Although in the preferred form of my invention I have shown and described a discharge orifice 14 at the bottom of the cup A, it should be noted that I do not thereby limit myself to that precise form, as conditions may arise where it would be advantageous to locate said discharge orifice 14 at an angle to the plane of the center line passing through the stem 9 and the orifice 14 shown in Figure 1, without departing from the spirit and intent of my invention.

In operation the cup A may be filled either by removing the cover C or by removing the plug E, but in either event the auxiliary variable pressure element D should be rotated by means of the thumb pieces 6 and 7 until the stem 9 has been withdrawn and moved vertically upwards as far as the diaphragm 13, suspended within said stem 9, will permit.

If the cup A is filled by removing the cover C, in replacing said cover, it is only necessary to engage a few of the screw threads 3, and to make certain that the spring catch 5 on the cup A is seated in one of the recesses 4 on said cover C. Direct variable pressure may then be exerted upon the lubricating material placed in the cup A, by continuing progressively to engage additional screw threads 3, which action will move the said cover in a downwardly vertical direction.

When said cover C cannot be further moved in a downwardly vertical direction, additional variable pressure may be exerted upon the lubricating material within the cup A by turning the auxiliary variable pressure element D so as to impart to said element a downwardly vertical movement. As hereinbefore described, said downwardly vertical movement of the said element D and the resulting variable pressure will be communicated to the diaphragm 13 and corresponding variable pressure will be exerted upon the mass of lubricating material within said cup and beneath said diaphragm.

If, however, the cup A is filled by removing the plug E, the auxiliary variable pressure element D must first be moved upwardly as above stated, and the cover C moved upwardly until only a few of the screw threads 3 are engaged, care being observed that the spring catch 5 on the cup A has not become disengaged from the recess 4. The plug E is then wholly removed from the stem 9 and communication opened with the interior of the cup A through the thimble 10, and said cup may be filled with lubricating material through the opening in the top of the stem 9 by attaching thereto by means of the screw-threads 16 a collapsible tube container of grease, or by similarly attaching thereto a grease gun containing grease, or other obvious means of filling said cup A through said opening may be readily employed.

It should be noted that the cup A may also be refilled through the stem 9 and thimble 10 partly or wholly by means of suction created within said cup below the diaphragm 13. When the stem 9 and diaphragm 13 are at their lowest positions within the cup A, a suitable container of lubricating material may be attached to the stem 9 at the screw threads 16, and, if the set screw 11 is within the recess 12, the upward movement of the stem 9 will cause a corresponding upward movement of the diaphragm 13. The resulting suction created below said diaphragm will operate to withdraw the contents of said container into said cup below said diaphragm.

It should be particularly noted, however, that the use of the set screw 11 and cooperating annular recess 12 is optional and may be dispensed with. It is obvious, if said screw and recess are omitted, that the contents of the cup A may be discharged therefrom as previously set forth, and when it is desired to refill the cup A through the stem 9 and thimble 10, the stem 9 is raised independently of said thimble and the diaphragm 13 attached to said thimble, and that lubricating material forced into said cup through said stem and thimble will force said diaphragm upwardly until the upper surface thereof is again in contact with the lower edge 15 of said stem.

When the cup A is filled with lubricating grease, the plug E is inserted in the upper opening of the stem 9, and variable pressure may then be applied to the mass of lubricating grease within the cup A by imparting a downwardly vertical movement to the plug E, the cover C, the stem 9 and the diaphragm 13, as hereinbefore set forth and described.

I desire it to be understood that whereas I have shown in the drawings and described in this specification my preferred form of lubricating grease cup, I in no wise intend to confine or limit this invention to that precise form, arrangement, material or construction which I have shown and described. It is believed that I have shown and described a lubricating grease cup embodying certain principles that are effectual for the objects and purposes intended; a device having few parts, simple in operation; yet it will be obvious that said device may be changed and modified to suit varying conditions and trade requirements without departing from the spirit of my invention, and said changes and modifications may be made as come properly within said spirit and the scope of the appended claims.

I claim:

1. A lubricating device comprising a receptacle having a discharge orifice, variable pressure means for said receptacle, means for locking the same at predetermined positions on said receptacle, a stem rotatably mounted in said cover and means embodying a thimble and diaphragm rotatably mounted within said stem and adapted to slidably contact the inner faces of said receptacle to forcefully discharge the lubricating material contained within said receptacle through said orifice.

2. A lubricating device comprising a receptacle having a discharge orifice, a flanged cover threaded on the open top of said receptacle, said cover having an inreaching hub, the flange of said cover being spacedly recessed, a spring detent fixed on the body of said receptacle to engage in the mentioned recesses, and variable pressure means rotatably mounted in the hub of said cover, said means being adapted to slidably contact the inner faces of said receptacle for forcefully discharging the lubricating material contained within said receptacle through said orifice.

3. A lubricating device comprising a receptacle having a discharge orifice, a flanged cover adjustably threaded on said receptacle and having an inreaching hub, a sleeve threaded in said hub having means for rotation, a plug in the outer end of said sleeve, a tube fitting said sleeve to abut said plug, means to hold said tube in the sleeve, and a conic diaphragm on the lower end of said tube to slidably contact the inner faces of said receptacle for forcefully discharging the lubricating material contained in said receptacle through said orifice.

4. A lubricating device, comprising a cup having a discharge orifice, a variable pressure cover for said cup, an auxiliary, variable pressure element, rotatably mounted in said cover, a plug, mounted in and cooperating with the element, and a combined thimble and diaphragm, said thimble being rotatably mounted in said element and said diaphragm being encased within said cup, in slidable contact with the inner face thereof, said pressure cover and auxiliary pressure element cooperating with said thimble and diaphragm, to slidably move said diaphragm relatively to said cup and thereby forcefully discharge, through said orifice, lubricating material contained within said cup, beneath said diaphragm.

GULIELMUS V. HEIDT.